Dec. 26, 1939.  W. F. GROENE ET AL  2,184,590
CRANKSHAFT CHUCK
Filed June 27, 1938    2 Sheets-Sheet 1
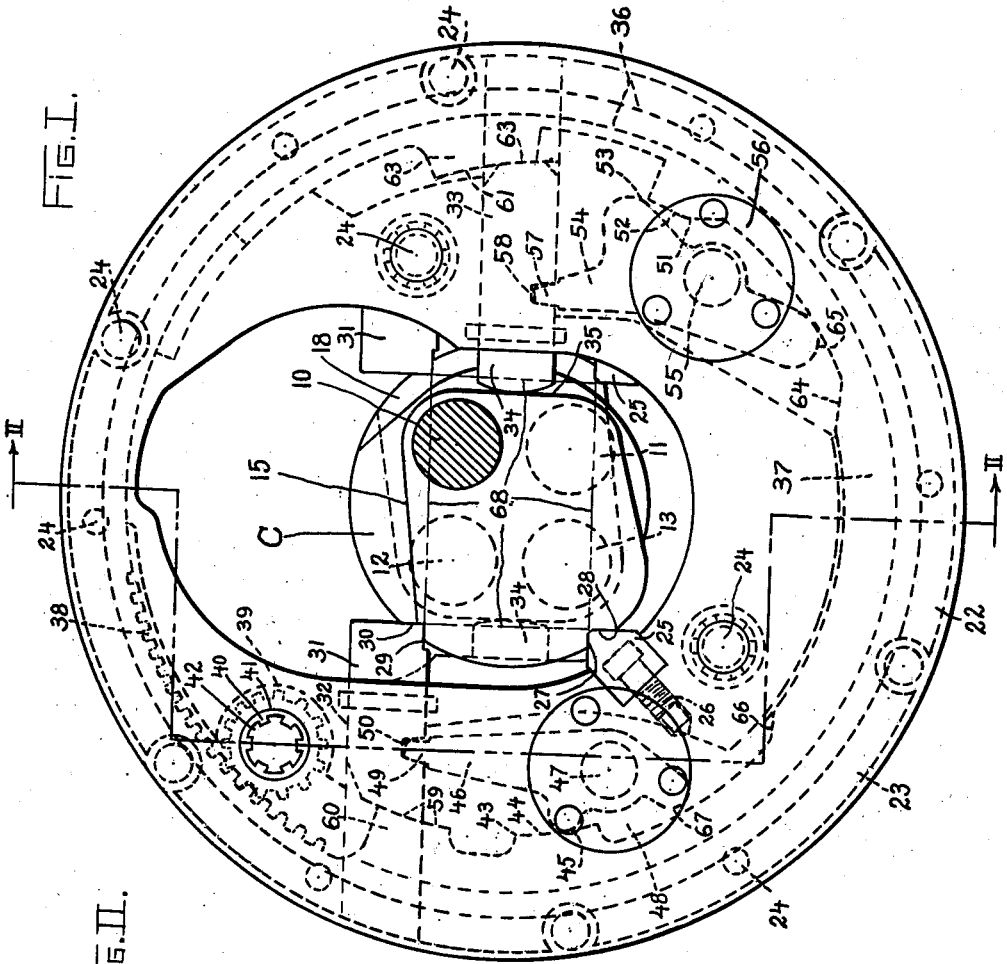
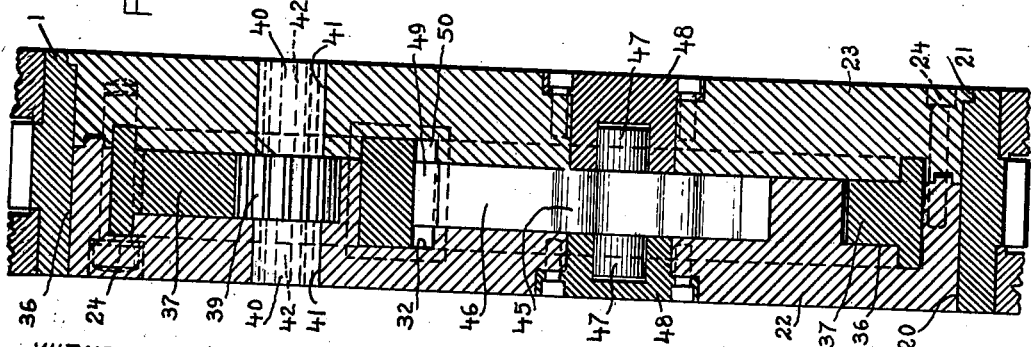
WITNESS.
Elmer R. Shipley.
INVENTORS.
WILLIAM F. GROENE
WALTER R. MEYER
BY Willard S. Groene
ATTORNEY.

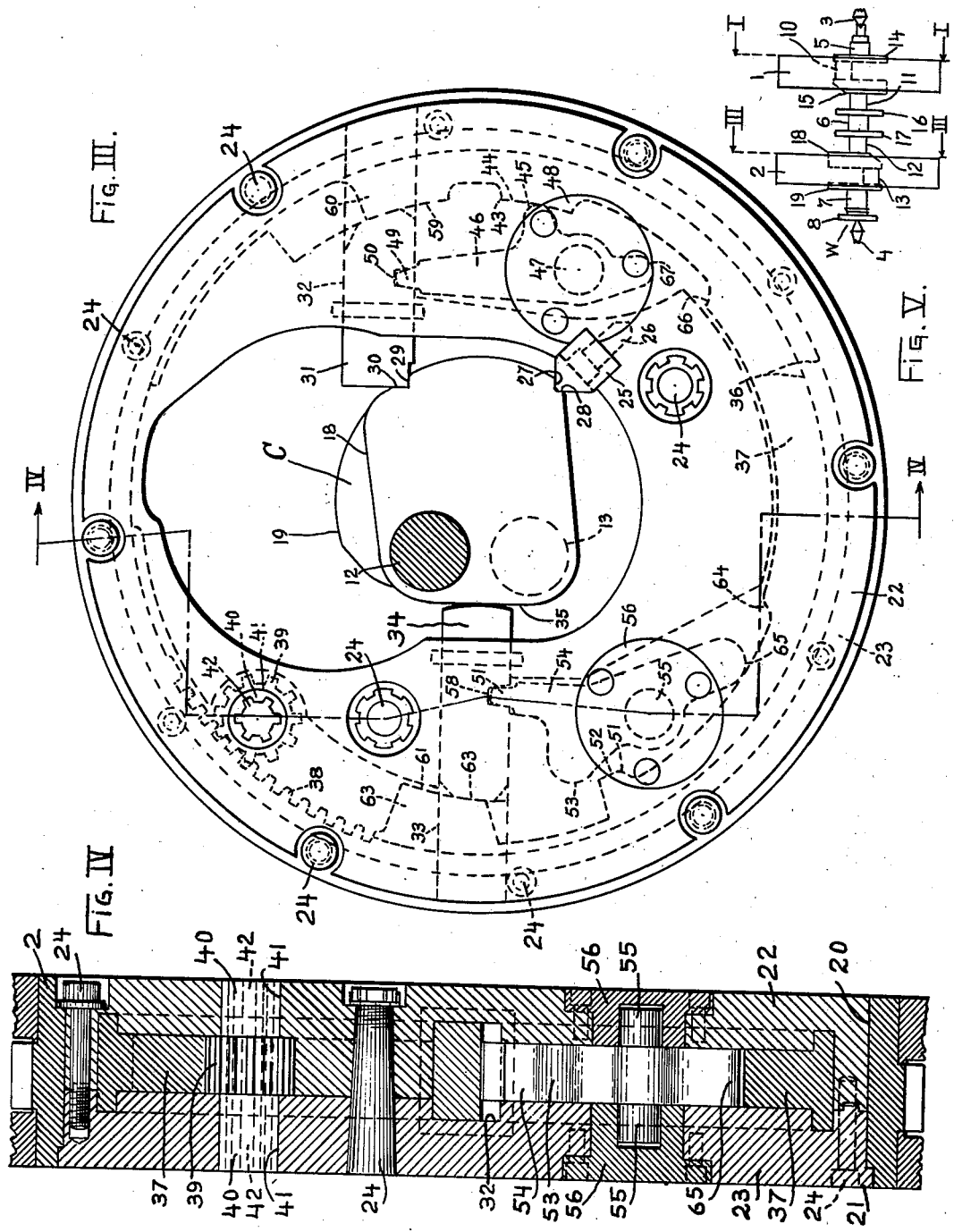

Patented Dec. 26, 1939

2,184,590

UNITED STATES PATENT OFFICE 2,184,590

CRANKSHAFT CHUCK

William F. Groene and Walter R. Meyer, Cincinnati, Ohio, assignors to The R. K. LeBlond Machine Tool Company, Cincinnati, Ohio, a corporation of Delaware Application June 27, 1938, Serial No. 216,016

23 Claims. (Cl. 82—40)

Our invention relates to machine tool construction and more especially to chucks for lathes of the center drive type as illustrated in Patent 2,069,107 dated January 26, 1937. Our invention pertains to certain improvements in chucks of a character shown in Patents 2,030,020 dated February 4, 1936, and 2,106,501 dated January 25, 1938, which chucks are adapted to chuck crankshafts by means of finished locating areas prepared in the rough webs of said crankshafts.

An object of this invention is to provide in a chuck of this character a single operating and clamping means for fully engaging or disengaging the chuck from the work.

Another object is to provide movable means for some of the locating abutments in the chuck in conjunction with fixed abutments for engaging locating areas on the work and cooperating clamping means engaging rough surfaces of the work.

Another object is to provide in a chuck having fixed and movable abutment means and cooperating clamping means as set forth above, means operated from a single source for actuating said movable abutment means and said clamping means in a predetermined sequential relationship.

Still another object is to arrange a pair of these chucks in a lathe in a predetermined circumferential position relative to one another to effect positive holding of a work piece against any forces exerted upon it by the cutting tools of said lathe.

And still another object is to arrange a pair of said chucks so as to effect a rectangular work engaging and locating assembly for holding a work piece with maximum rigidity and to provide a unique cooperating clamping means in said assembly.

Further objects and advantages of our invention will be set forth in the following detailed description of the drawings in which:

Figure I is a right hand end elevation, partly in section, of the center drive chuck associated with the stub end of a crankshaft in a double center drive lathe as indicated by the line I—I of Figure V.

Figure II is a section through the chuck substantially in the line II—II of Figure I.

Figure III is a right hand end elevation, partly in section, of the center drive chucking device associated with the flange end of a crankshaft in a double center drive lathe as indicated by the line III—III of Figure V.

Figure IV is a section through the chuck substantially on the line IV—IV of Figure III.

Figure V is a diagrammatic view showing a crankshaft held on centers and in the center drive chucks of a typical double center drive lathe.

Each of the chucking devices of Figures I and III are applicable to a single center drive crankshaft lathe. They are also each adapted to be used as a pair in the ring gears of a double center drive lathe. More especially are these chucks adapted to be both used in a double center drive lathe having a pair of center drive ring gears 1 and 2 located between the usual centers 3 and 4 for supporting the end of a crankshaft C.

The chucks in these ring gears 1 and 2 are shown arranged to chuck a typical four throw V-eight crankshaft C having the line bearings 5, 6, and 7 and associated flange and stub ends 8 and 9, the pin bearings 10, 11, 12, and 13, and the inter-connecting webs 14 to 19, inclusive. The chuck of Figures I and III is shown engaging the web 15 which is near the stub end of the crankshaft C and for explanatory purposes this chuck will be called the stub end chuck. Similarly the chuck of Figures III and IV engages the web 18 near the flange end and will be called the flange end chuck.

Referring particularly to Figures I and II, in the bore 20 and counterbore 21 of the ring gear are fixed the side plates 22 and 23 by suitable bolts 24. On these plates is fixed the abutment block 25, by suitable screws 26, which engages the finished locating faces 27 and 28 of the web 15 of the crankshaft. Adapted to engage the finished locating faces 29 and 30 of the web 15 is the movable plunger 31 slidable in a suitable guideway 32 formed by the side plates 22 and 23. Also slidably mounted in a suitable guideway 33 in the side plates 22 and 23 is the clamping plunger 34 adapted to engage the rough surface 35 of the web 15 of the crankshaft C.

A single control means is provided for actuating the plungers 31 and 34 in a predetermined sequence for chucking and unchucking the crankshaft. In an appropriate arcuate guideway 36 formed in plates 22 and 23 is slidably mounted the arcuate actuating cam ring 37 having rack teeth 38 which are engaged by the actuating pinion 39 having hubs 40 journaled in appropriate bearings 41 in the side plates. A suitable splined bore 42 is formed in said hubs to receive a socket wrench to facilitate powerful rotation of pinion 39.

When the pinion 39 is rotated clockwise in Figure I (or counter-clockwise in Figure III) the cam ring 37 is moved so that the edge 43 of its projection 44 engages the projection 45 of the actuating lever 46 which is pivotally mounted by its trunnions 47 in suitable bushings 48 fixed in the side plates 22 and 23 and has a toothed end 49 engaging a slot 50 in the plunger 31. The lever 46 is thus moved clockwise bringing the plunger 31 into initial engagement with the locating areas 29 and 30 of the crankshaft. Sufficient clearance is allowed between the projection 44 of the cam ring 37 and the projection 45 of lever 46 so as not to force the lever and plunger against the crankshaft and thus push the shaft out of true centered position already established by the centers and the fixed locating blocks 25. While this movement of the plunger 31 takes place the clamping plunger 34 is similarly brought into initial engagement with the surface 35 by the edge 51 of the projection 52 of the cam ring 37 striking the projection 53 of the lever 54 pivotally mounted on its trunnion 55 in suitable bushings 56 fixed in the side plates 22 and 23, its outer toothed end 57 engaging the slot 58 formed in the plunger 34. Continued clockwise rotation of the pinion 39 causes the surface 59 of the projection 60 of the cam ring 37 which surface is concentric with the guideway 36 for the cam ring 37, to pass behind the plunger 31 to thereby position said plunger in a predetermined definite position relative to the axis of rotation of the chuck so that it functions as a fixed abutment like the abutment 25. After the surface 59 has substantially passed behind the plunger 31 the eccentric cam surface 61 of the projection 62 of the cam ring 37 engages the tapered inward end 63 of the clamping plunger 34 to force it against the surface 35 of the web and thus hold the web securely against the abutment 25 and plunger 31.

To release the work from the chuck the pinion is rotated counterclockwise in Figure I (clockwise in Figure III) withdrawing the projection 63 from behind the clamping plunger 34 and the projection 60 from behind the plunger 31. Continuing this movement the cam surface 64 of the cam ring 37 engages the projection 65 of the lever 54 to rapidly withdraw the clamping plunger 34 from the work while the cam surface 66 engages the projection 67 of the lever 46 to rapidly withdraw the plunger 31 from the work thus allowing free access to the chuck to facilitate loading and unloading of the work. The construction and operation of the flange end chuck of Figure III is substantially like that of the stub end chuck of Figure I just described.

A novel arrangement is provided when these chucks are used as a pair in a lathe. Such an arrangement is best shown in Figure I and comprises circumferentially orienting one chuck relative to the other so that the fixed abutments 25 are positioned to one side of the axis of rotation of the chucks while the movable abutments are positioned to the other side of said axis. Also the fixed abutments of each chuck are located diametrically opposite the movable abutments of each chuck so as to form substantially a rectangle with abutment means at each corner as indicated by the lines 68 to thereby afford maximum stability for the work in the chucks. It is also to be noted that the clamping plungers are diametrically opposite each other to neutralize the effect of their clamping action on the work.

Having thus fully set forth and described our invention, what we claim as new and desire to secure by United States Letters Patent is:

1. In a chuck, a rotatable chuck body, fixed locating abutment means in said body, movable locating abutment means in said body, cooperating clamping means in said body, and means for actuating said movable locating means, and said clamping means in a predetermined sequential relationship to effect gripping of a work piece in said chuck.

2. In a chuck, a rotatable chuck body, fixed locating abutment means in said body, movable locating abutment means in said body, cooperating clamping means in said body, and a single means for actuating said movable locating means and said clamping means to effect gripping of a work piece in said chuck.

3. In a chuck adapted to support and rotate a work piece by means of finished locating areas provided on said work piece, a rotary chuck body, fixed locating abutment means on said body adapted to engage locating areas on said work piece in the chuck, movable locating abutment means on said body adapted to engage locating areas on said work piece, and cooperating clamping means on said body adapted to engage rough surfaces of said work piece to hold said work against said abutments when in work engaging position.

4. In a chuck adapted to support and rotate a work piece by means of finished locating areas provided on said work piece, a rotary chuck body, fixed locating abutment means on said body adapted to engage locating areas on said work piece in the chuck, movable locating abutment means on said body adapted to engage locating areas on said work piece, a movable clamp in said body adapted to engage rough surfaces of said work piece to hold said work against said abutments when in work engaging position, and a single actuating means for operating said movable locating abutment means and said clamp in sequential relationship.

5. In a chuck, a rotatable chuck body, fixed locating abutment means in said body, movable locating abutment means in said body, cooperating clamping means in said body, actuating means for moving said movable abutment means to or from work engaging and locating position, actuating means for moving said clamping means to or from work engaging position, and a single common means for rendering said actuating means effective.

6. In a chuck, a rotatable chuck body, fixed locating abutment means in said body, movable locating abutment means in said body, cooperating clamping means in said body, actuating means for moving said movable abutment means to or from work engaging and locating position, actuating means for moving said clamping means to or from work engaging position, and a single common means for rendering said second mentioned actuating means effective after said first mentioned actuating means is rendered effective when gripping a work piece in said chuck and for rendering said first mentioned actuating means effective after said second mentioned means is rendered effective when releasing a work piece from said chuck.

7. In a chuck, a rotatable chuck body, fixed locating abutment means in said body, movable locating abutment means in said body, cooperating clamping means in said body, actuating levers pivotally mounted on said body and connected to said movable abutment and said clamping means, cam means for operating said levers, and a single means for rendering said cam means operative.

8. In a chuck, a rotatable chuck body, fixed locating abutment means in said body, movable locating abutment means in said body, cooperating clamping means in said body, actuating levers pivotally mounted on said body and connected to said movable abutment and said clamping means, cam means for operating said levers to initially position and to rapidly withdraw said movable abutment and clamping means, and means for accurately positioning said movable locating abutment and for final tightening of said clamping means.

9. In a chuck, a rotatable chuck body, fixed locating abutment means in said body, movable locating abutment means in said body, cooperating clamping means in said body, actuating levers pivotally mounted on said body and connected to said movable abutment and said clamping means, cam means for actuating said levers in a predetermined sequence and for accurately positioning said movable abutment and for final tightening of said clamping means, and a single means for actuating said cam means.

10. In a chuck, a rotatable chuck body, fixed locating abutment means in said body, a movable locating abutment plunger mounted in said body, a clamping plunger mounted in said body, an actuating lever pivotally mounted on said body and connected to said abutment plunger, an actuating lever pivotally mounted on said body and connected to said clamping plunger, an arcuate cam ring mounted in said body, a single means for operating said cam ring, and cam surfaces on said ring operatively engaging said levers and said plungers.

11. In a chuck, a rotatable chuck body, fixed locating abutment means in said body, a movable locating abutment plunger mounted in said body, a clamping plunger mounted in said body, an actuating lever pivotally mounted on said body and connected to said abutment plunger, an actuating lever pivotally mounted on said body and connected to said clamping plunger, an arcuate cam ring mounted in said body, a single means for operating said cam ring, cam surfaces on said ring operatively engaging said levers to effect initial positioning and rapid withdrawal of said plungers, and further cam surfaces on said ring for accurately positioning said abutment plunger and for tightening said clamping plunger.

12. In a chucking device, a rotary chuck body, a pair of fixed locating abutments in said body located to one side of the axis of rotation of said chuck body, a pair of movable abutments in said chuck body located on the other side of said axis from said fixed abutments thus forming a rectangle surrounding said axis with locating abutments at the corners of said rectangle, and cooperating clamping means associated with said abutments.

13. In a chucking device, a rotary chuck body, a pair of fixed locating abutments in said body located to one side of the axis of rotation of said chuck body, a pair of movable abutments in said chuck body located on the other side of said axis from said fixed abutments thus forming a rectangle surrounding said axis with locating abutments at the corners of said rectangle, and a pair of diametrically opposed clamping means associated with said abutments.

14. In a chucking device, a rotary chuck body, a pair of fixed locating abutments in said body located to one side of the axis of rotation of said chuck body, a pair of movable abutments in said chuck body located on the other side of said axis from said fixed abutments thus forming a rectangle surrounding said axis with locating abutments at the corners of said rectangle, and a pair of diametrically opposed clamping means located between said fixed abutments and said movable abutments and cooperating therewith.

15. A chucking mechanism comprising, a pair of rotatable chuck bodies, a fixed locating abutment, a movable locating abutment, and a clamping means in each of said bodies, and a single means on each of said bodies for actuating said movable abutments and clamping means, said bodies being circumferentially oriented relative to each other so that said fixed abutments are located to one side of the axis of rotation of said bodies and said movable abutments are located to the other side of said axis.

16. A chucking mechanism comprising, a pair of rotatable chuck bodies, a fixed locating abutment, a movable locating abutment, and a clamping means in each of said bodies, and a single means on each of said bodies for actuating said movable abutments and clamping means, said bodies being circumferentially oriented relative to each other so that said fixed abutments are located to one side of the axis of rotation of said bodies and said movable abutments are located to the other side of said axis, said clamping means being diametrically opposed to each other and lying between said fixed abutments and said movable abutments.

17. In a chuck, a chuck body, a locating abutment fixed on said body, a movable locating abutment mounted on said body, a movable clamping means mounted on said body, common means for moving said movable abutment to a definite locating work engaging position and for moving said clamping means into work engaging position, and a single operating means for rendering said common means operative.

18. In a chuck, a chuck body, a locating abutment fixed on said body, a movable locating abutment mounted on said body, a movable clamping means mounted on said body, common means for moving said movable abutment to a definite locating work engaging position and for moving said clamping means into work engaging position, actuating levers mounted on said body cooperating with said common means and said movable abutment and clamping means for rapidly actuating said movable abutment and clamping means to and from work engaging position, and means for actuating said common means.

19. In a chuck, a chuck body, a locating abutment fixed on said body, a movable locating abutment mounted on said body, a movable clamping means mounted on said body, a movable cam ring mounted in said body, means on said cam ring for moving said movable locating abutment to a definite locating work engaging position and for moving said clamping means into work engaging position, actuating levers pivotally mounted in said body and connected to said movable locating abutment and said clamping means on said cam ring for actuating said levers to rapidly position said movable locating abutment and clamping means in work engaging position or to rapidly withdraw them from work engaging position, said cam ring being arranged to actuate said movable locating abutment and said clamping means and said actuating levers in a predetermined sequence, and a single operating means for said cam ring.

20. In a chucking device, a rotary chuck body, a pair of locating abutments in said body located to one side of the axis of rotation of said chuck body, a clamping means located on the other side of said axis and cooperating with said abutments, said abutments and clamping means being circumferentially positioned about said axis so as to form a triangle surrounding said axis with the locating abutments at the ends of its base and the clamping means located at its apex.

21. In a chucking device, a rotary chuck body, a pair of locating abutments in said body located to one side of the axis of rotation of said chuck body, a clamping means located on the other side of said axis and cooperating with said abutments, said abutments and clamping means being circumferentially positioned about said axis so as to form a triangle surrounding said axis with the locating abutments at the ends of its base and the clamping means located at its apex, a second pair of locating abutments and cooperating clamping means forming a triangle as mentioned for said first mentioned locating abutments and clamping means, said second mentioned triangle being circumferentially oriented about said axis relative to said first mentioned triangle so that the apex of each triangle lies substantially at the mid-point of the base of the other triangle.

22. In a chucking device, a rotary chuck body, a pair of locating abutments in said body located to one side of the axis of rotation of said chuck body, a clamping means located on the other side of said axis and cooperating with said abutments, said abutments and clamping means being circumferentially positioned about said axis so as to form a triangle surrounding said axis with the locating abutments at the ends of its base and the clamping means located at its apex, a second pair of locating abutments and cooperating clamping means forming a triangle as mentioned for said first mentioned locating abutments and clamping means, said second mentioned triangle being circumferentially oriented about said axis relative to said first mentioned triangle so that said axis lies within an area defined by both of said triangles.

23. In a chucking device, a rotary chuck body, a pair of locating abutments in said body located to one side of the axis of rotation of said chuck body, a clamping means located on the other side of said axis and cooperating with said abutments, said abutments and clamping means being curcumferentially positioned about said axis so as to form a triangle surrounding said axis with the locating abutments at the ends of its base and the clamping means located at its apex, a second pair of locating abutments and cooperating clamping means forming a triangle as mentioned for said first mentioned locating abutments and clamping means, said second mentioned triangle being circumferentially oriented about said axis relative to said first mentioned triangle so that said axis lies substantially in a line passing through the apex of said triangles.

WILLIAM F. GROENE.
WALTER R. MEYER.